(12) United States Patent
Endrich (10) Patent No.: US 11,441,688 B2
(45) Date of Patent: Sep. 13, 2022

(54) COMPONENT OF HYDRAULICS, ARRANGEMENT HAVING A PORTION OF THE COMPONENT, AND METHOD FOR JOINING TOGETHER THE COMPONENT

(71) Applicant: Robert Bosch GmbH, Stuttgart (DE)

(72) Inventor: Daniel Endrich, Retzbach (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 17/022,937

(22) Filed: Sep. 16, 2020

(65) Prior Publication Data

US 2021/0095771 A1 Apr. 1, 2021

(30) Foreign Application Priority Data

Sep. 27, 2019 (DE) ...................... 10 2019 214 857.3

(51) Int. Cl.

| B23K 20/12 | (2006.01) |
|---|---|
| F16K 11/07 | (2006.01) |
| F15B 13/04 | (2006.01) |
| B29C 65/64 | (2006.01) |
| B33Y 80/00 | (2015.01) |
| B29L 31/00 | (2006.01) |
| F15B 13/02 | (2006.01) |
| B22F 5/10 | (2006.01) |

(52) U.S. Cl.
CPC .............. *F16K 11/07* (2013.01); *B23K 20/12* (2013.01); *B29C 65/645* (2013.01); *B33Y 80/00* (2014.12); *F15B 13/0402* (2013.01); *B22F 5/10* (2013.01); *B23K 20/122* (2013.01); *B29L 2031/7506* (2013.01); *F15B 13/02* (2013.01)

(58) Field of Classification Search
CPC ......... F16K 11/07; B33Y 80/00; B23K 20/12; B23K 20/122; B29C 65/645; F15B 13/0402; F15B 13/02; B29L 2031/7506; B22F 5/10
USPC .................. 137/625.48; 228/112.1; 156/73.5
See application file for complete search history.

(56) References Cited

U.S. PATENT DOCUMENTS

| 10,060,482 B2 * | 8/2018 | Dietrich | B23K 33/006 |
|---|---|---|---|
| 2005/0127140 A1 * | 6/2005 | Slattery | B23K 20/129 |
| | | | 228/112.1 |
| 2007/0240774 A1 * | 10/2007 | McCarty | F16K 47/08 |
| | | | 137/625.37 |
| 2007/0262488 A1 * | 11/2007 | Chen | B29C 66/1142 |
| | | | 156/308.2 |
| 2009/0220820 A1 * | 9/2009 | Kolbe | B23K 33/008 |
| | | | 428/615 |
| 2009/0317179 A1 * | 12/2009 | Christ | B23K 20/1295 |
| | | | 403/271 |
| 2010/0038404 A1 * | 2/2010 | Lingnau | B23K 13/015 |
| | | | 228/2.1 |
| 2010/0233501 A1 * | 9/2010 | Messer | B23K 20/129 |
| | | | 156/60 |
| 2011/0119914 A1 * | 5/2011 | Janssen | B23K 20/12 |
| | | | 92/260 |

(Continued)

*Primary Examiner* — Minh Q Le
(74) *Attorney, Agent, or Firm* — Maginot, Moore & Beck LLP (57) ABSTRACT

A component of hydraulics, via which a pressure medium connection or flow can be controlled, includes a first portion which is additively manufactured at least in part and on which there is formed at least one control geometry for controlling the pressure medium connection or flow, and a second portion joined thereto.

20 Claims, 7 Drawing Sheets

(56) References Cited

U.S. PATENT DOCUMENTS

| | | | |
|---|---|---|---|
| 2014/0018178 A1* | 1/2014 | Yoshida | B23K 20/129 228/102 |
| 2015/0321250 A1* | 11/2015 | Xu | F01D 9/04 228/119 |
| 2015/0336203 A1* | 11/2015 | Zhai | B29C 65/06 228/2.1 |
| 2016/0061385 A1* | 3/2016 | Lin | F15C 1/146 137/15.01 |
| 2016/0288247 A1* | 10/2016 | Sweeting | B23K 20/12 |
| 2016/0290368 A1* | 10/2016 | Collins | F16K 31/082 |
| 2017/0246707 A1* | 8/2017 | Bray | B23K 20/1225 |
| 2018/0180070 A1* | 6/2018 | Uesugi | F15B 13/0871 |
| 2018/0209280 A1* | 7/2018 | Forsdike | B23K 20/16 |
| 2018/0216636 A1* | 8/2018 | Scovell | F04D 27/0215 |
| 2019/0030658 A1* | 1/2019 | Cutrona | B23K 13/01 |
| 2019/0168335 A1* | 6/2019 | Onose | B23K 20/227 |
| 2019/0169966 A1* | 6/2019 | Boul | E21B 33/14 |
| 2021/0116947 A1* | 4/2021 | Czechowski | G05D 16/10 |
| 2021/0207741 A1* | 7/2021 | Watson | F16K 3/246 |

\* cited by examiner

COMPONENT OF HYDRAULICS, ARRANGEMENT HAVING A PORTION OF THE COMPONENT, AND METHOD FOR JOINING TOGETHER THE COMPONENT

This application claims priority under 35 U.S.C. § 119 to application no. DE 10 2019 214 857.3, filed on Sep. 27, 2019 in Germany, the disclosure of which is incorporated herein by reference in its entirety.

The disclosure relates to a component of hydraulics, to an arrangement having an isolated portion of the component, and to a method for joining together the component from its isolated portions.

BACKGROUND

Additively manufactured or 3D-printed components provide new freedoms in terms of geometric shaping. This is in particular because boundary conditions of conventional or traditional manufacturing methods, such as, for example, the release properties on primary forming, do not apply. This circumstance facilitates construction, permits an increased volume utilization and assists with function-oriented shaping.

Additive manufacture is particularly appropriate in the production of components which simultaneously exhibit demands in terms of a low weight in order to achieve high dynamics, in terms of complex geometries, for example for fluidic or strength optimization. However, the additive manufacture especially of large-volume or elongate components is expensive, time-consuming and susceptible to distortion in respect of tolerances.

Components of hydraulics frequently comprise portions which differ greatly in their demands in respect of dimensional complexity, strength, inter alia. A hybrid manufacture of individual portions of such components and the joining thereof is therefore appropriate. Portions with complex geometry can accordingly be manufactured additively, and portions with less complex geometry can be manufactured non-additively, or in an alternative way. Joining can take place in a material-bonded manner by means of welding.

A disadvantage is that conventional welded joints can be produced only between portions of the same or at least similar materials and only with a large outlay, in particular in terms of safety and post-processing. Many material combinations are thereby impossible.

SUMMARY

In contrast, the object underlying the disclosure is to provide a component of hydraulics having at least one additively manufactured portion and a portion joined thereto, in which the possible material combinations of the portions are more varied. A further object underlying the disclosure is to provide an arrangement having at least one portion or semi-finished part of the component, and a method for joining together the component.

The first object is achieved by a component of hydraulics having the features described below, the second by an arrangement having the features described below, and the third by a method having the features described below.

A component of hydraulics via which a pressure medium connection or pressure medium flow can be controlled has a first portion which is additively manufactured or 3D-printed at least in part. In particular, this first portion has geometries which must meet high demands in terms of a low pressure loss, an optimal flow, heat conduction or a high strength/weight ratio. Additive manufacture is particularly suitable for this purpose since it is able to represent complex geometries that are necessary therefor almost without limitations. The first portion thereby has at least one control geometry for controlling the pressure medium connection or pressure medium flow. The component of hydraulics additionally has a second portion which is joined to the first portion by a material-bonded connection. According to the disclosure, the two portions are joined by means of friction welding or have a friction-welded joint with one another.

This type of material-bonded joining of the portions to form the component solves multiple technical problems simultaneously. While ensuring a strong bond between the portions, the portions can nevertheless be made of different materials, such as, for example, titanium with copper or aluminum with steel. Friction welding is found to be a more stable, more reproducible manufacturing process with a short welding time. Compared with conventional welding methods, neither sparks, smoke nor weld spatters form. No additional materials are necessary. The outlay for safety measures and post-treatment is therefore reduced. Owing to the mentioned advantages of the process, the friction-welded component is found to be inexpensive.

In a further development, the first portion is limited to a region of the component that is geometrically complex, in particular with pressure medium chambers, pressure medium channels, the control geometry or geometries which meet the demands for optimal flow with a low pressure loss, and/or with hollow spaces and support geometries formed on the inside, which meet the demands in terms of the strength/weight ratio.

In a further development, the first portion is of small dimensions compared to the second portion in terms of volume and/or diameter and/or axial length. The comparatively cost-intensive additive manufacture of the first portion is thereby limited to a small region and the alternative manufacture of the second portion is limited to a large region so that, overall, economical manufacture is possible, which optimally meets all the technical demands.

The geometrically less complex second portion is preferably produced non-additively or conventionally by means of a manufacturing method such as, for example, turning, milling or casting.

As a result of the particular manufacturing method of the portions, which is in each case chosen in dependence on the function to be performed and/or the demands to be met by the portion, the advantages of the particular manufacturing method can optimally be utilized. Owing to the joining of the portions to form the component, the component then combines the advantages of the manufacturing methods. Owing to the high flexibility of friction welding in terms of possible material combinations and manufacturing methods of the portions, the component joined together from the portions can be or is particularly well optimized in terms of material, manufacture, function and costs.

In a further development, the second portion comprises a comparatively inexpensive material.

At least one of the materials of the first and second portion comprises metal. The material of the respective other portion can comprise metal and/or plastics material.

In a further development, the first portion preferably comprises a material with high thermal conductivity and/or it has a flow-optimized design.

In a further development, the first portion has a complex internal or external geometry.

In a further development, the first portion is arranged centrally between two second portions, in particular symmetrically, and is joined thereto, in particular in each case by friction welding.

In a further development, a hollow space, pressure chamber or pressure medium channel, in particular of the first portion, is closed in a fluid- or gas-tight manner by the friction-welded joint.

The friction-welded joint can be demonstrated in particular by destructive testing by means of grinding and/or metallography.

In a further development, the second portion is manufactured additively, subtractively, by reshaping or by primary shaping.

In a further development, a region in which the friction-welded joint is formed has a tapered or frustoconical or cylindrical spatial shaping. This can be demonstrated in particular by grinding and metallography. The reason for the spatial shaping are friction surfaces of the first and second portions that are of geometrically corresponding form prior to the friction welding.

In a preferred further development there is formed on the first portion a clamping region, in particular a clamping surface, for the attachment of a clamping means for the purposes of friction welding.

In a further development, the clamping region, in particular a wall thickness and/or topology facing from the clamping region into the interior of the first portion, is designed for an axial and/or radial clamping force and/or for an axial and/or circumferential frictional force.

In a further development, the clamping region is divided into clamping portions. These can be spaced apart axially and/or circumferentially.

In a preferred further development, the clamping region is divided into clamping portions, of which at least one is formed circumferentially and another is formed axially at an end for absorbing a respective component of a clamping force.

In a further development, the clamping region is formed on the first portion at least in part on the outer circumference and/or axially at an end. In particular as a result of the clamping portion of the clamping region on the outer circumference, a torque necessary for the friction welding or a transverse force necessary for the friction welding can thus be absorbed. By means of the clamping portion of the clamping region axially at an end, the axial force or pressing force necessary for the friction welding can be absorbed.

In order that the first portion does not suffer any damage in the course of the friction welding, it has ribs and/or bars and/or at least one hollow space in particular in the clamping region and/or in regions between the clamping portions and/or along a force flow. These make possible a non-destructive force flow in the first portion.

A wall thickness and/or topology of the ribs or bars or of the hollow space is designed and/or optimized for absorption and/or transmission of the axial and/or radial clamping force and/or frictional force.

In a further development, the clamping region is formed at least in part by an inserted semi-finished part or insert, which in particular is manufactured in an alternative way. It can in particular be primary shaped, turned or milled and/or be additively joined to a remainder of the first portion.

In a further development, the component is a valve plunger, in particular a valve slide, for a hydraulic valve which in particular is of slide construction.

In a further development, a radial collar of the first portion is provided as the clamping region or clamping portion.

In the case of the further development as a valve plunger, the radial collar can be configured as a guide collar for guiding the valve plunger in a valve plunger bore of a valve housing of the hydraulic valve—in particular without a hydraulic function. Or it can be configured with a hydraulic function, in particular as a sealing collar or as a radial collar which has the at least one control geometry.

In a further development, the second portion is an actuating portion. In the case of the further development as a valve plunger, the actuating portion is in particular an actuating pin to which there can be applied in particular an actuating force of an electromagnet or of another actuator.

Preferably, the second portion is represented by a regulating geometry, cylindrical or conical, or composed of a plurality of such regulating geometries. Manufacture by turning or milling is suitable in particular for this purpose.

In a further development, the first portion is a hollow body. The second portion can in particular be in the form of a solid body, which facilitates the conventional manufacture thereof.

In particular, the valve plunger has a central axis, in particular an axial central axis.

In a further development, a plurality of the control geometries are provided spaced apart from one another along the central axis on the first portion, for controlling a plurality of pressure medium connections, in particular on one or more radial collars.

If the first portion is in the form of a hollow body, then, in a further development, there passes through the valve piston, for example, a passageway which is additively manufactured at least in part. In particular, this passageway can be configured to surround the control geometries. This passageway is formed in a fluidically advantageous manner when it is delimited towards the central axis. Thus no or hardly any dead spaces of a pressure medium flow are formed in the passageway.

In a further development, the first portion is optimized in terms of weight and strength and/or weight and flow resistance. As already mentioned, additive manufacture is optimal for this purpose.

For the manufacture of the component, the mentioned portions are present in isolated form prior to the friction welding.

An arrangement according to the disclosure has as a semi-finished part at least one first portion of the component present in isolated or loose form, which has been described hereinbefore. This first portion is to be joined to at least one second portion, which can be provided in isolated or loose form, to form the component according to at least one aspect of the preceding description. The first portion, as already mentioned, is additively manufactured at least in part and has at least one control geometry for controlling the fluid flow. According to the disclosure there is formed on the first portion a clamping region for attachment of a clamping means, by which a clamping force and/or a clamping moment for the joining by friction welding can be absorbed.

In a further development, the arrangement additionally has the second portion in isolated or loose form, which is at least in part manufactured additively or, as already mentioned above, in an alternative way, preferably completely in an alternative way.

For ultimate joining by friction welding, the arrangement in a further development has a clamping sleeve, in particular a slotted clamping sleeve, into which the first portion can be or has been inserted at least in part, wherein an inner lateral surface of the clamping sleeve is in contact, or at least can be brought into contact, in part with the clamping region of the first portion.

In a further development, the clamping region of the first portion is divided into clamping portions, of which at least one is formed on the first portion circumferentially and/or at least one is formed at an end.

At least one circumferential portion of the inner lateral surface is in contact with the at least one circumferential clamping portion, or can be brought into contact therewith. Alternatively or in addition, at least one end portion of the inner lateral surface is in contact with the at least one end clamping portion, or can be brought into contact therewith.

In a further development, there is formed on each of the first and second portion a friction surface for the friction welding, wherein at least one of the friction surfaces is planar or protrudes axially or is axially depressed. The friction surfaces of the first and second portion preferably have forms which are matched to one another in the sense of a male and a female form. In that manner, the two portions, for joining by friction welding, can be positioned and centered via the correspondingly formed friction surfaces.

In the case of the male and female, or protruding or depressed, friction surfaces, those surfaces are in particular tapered or frustoconical or cylindrical.

In a further development, the friction surface of planar form has a groove for an upset bead which forms in the course of the friction welding.

A method for joining together a component of hydraulics from at least two isolated or loose portions has the following steps: providing a first portion which is additively manufactured at least in part and has at least one control geometry for controlling a pressure medium connection or pressure medium flow and a clamping region for attachment of a clamping means; clamping the first portion at the clamping region; clamping a second of the portions; positioning the portions relative to and/or against one another; and joining the first portion to the second portion by a material-bonded connection. According to the disclosure, joining takes place in the method by means of friction welding. This gives rise to the advantages already mentioned above, both as regards possible material combinations, the division of the valve plunger into different functional regions, for example of pronounced stress caused by mechanical force, friction, heat and/or electrical conduction, and as regards high demands in terms of optimal control of a pressure medium connection with a low pressure loss. The method is stably reproducible and has short process times. No sparks, smoke or weld spatters are formed, and no additional materials are necessary. In friction welding, a so-called heat-affected zone is significantly smaller than in other welding methods. Accordingly, no melt forms, and thus there is scarcely any distortion. It is in many cases even possible to join metallic materials which otherwise do not form an alloy with one another.

In the method, the first portion and the second portion are moved relative to one another under pressure. A relative movement of the friction surfaces can take place by rotation and/or oscillation. The friction that occurs causes the portions to be heated and plasticized in the region of the friction surfaces. At the end of the method there is a step of positioning the portions exactly relative to one another under high pressure.

BRIEF DESCRIPTION OF THE DRAWINGS

Exemplary embodiments of a component of hydraulics according to the disclosure, of an arrangement according to the disclosure and of a method according to the disclosure are shown in the drawings. The disclosure will now be explained in greater detail with reference to the figures of those drawings.

In the figures.

DETAILED DESCRIPTION

Figure 1:
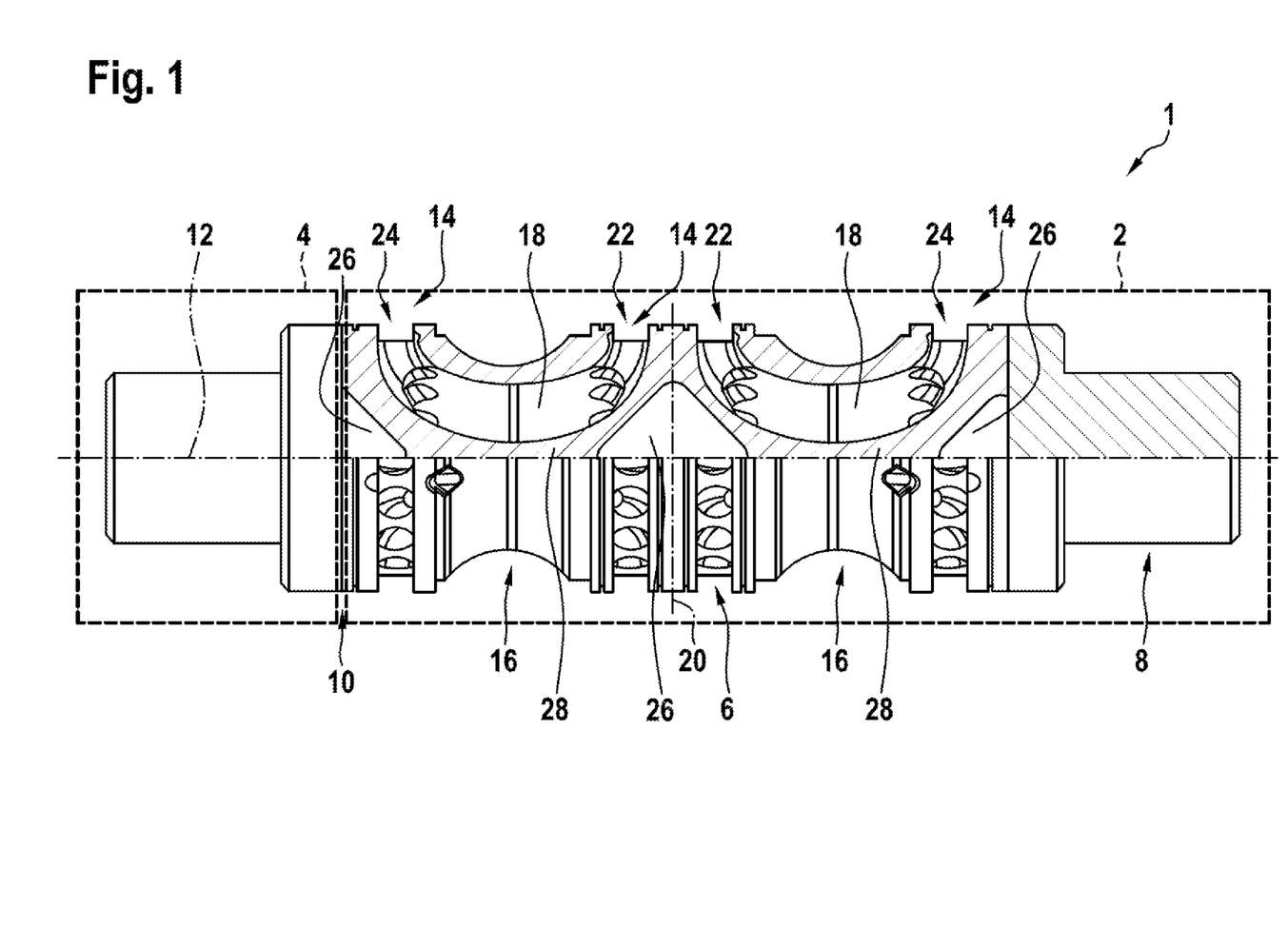
FIG. 1 shows an arrangement of portions of a component of hydraulics in the form of a valve plunger before joining, according to an exemplary embodiment, FIGS. 2a-2d each show a second portion of the valve plunger according to FIG. 1 that is to be joined, in each case having a different friction surface.

FIG. 1 shows a component of hydraulics, which is in the form of a valve plunger 1, joined together according to the disclosure, in a partially cutaway side view. The valve plunger 1 has a first portion 2, which has been additively manufactured in part, and a second portion 4 joined thereto by friction welding. The latter portion is configured as a turned part in the form of an actuating pin. The first portion 2 is divided into an additively manufactured plunger portion 6 with a complex outer and inner geometry and an insert 8 additively joined to the portion 6. The insert is fused onto the portion 6 during the additive manufacture. In the region between the portions 2 and 4 there is provided a friction-welded joint 10 according to the disclosure.

Additive manufacture makes it possible for the valve plunger 1 to be designed so that it is optimized for low pressure loss, low weight and high compressive strength. This results in the comparatively complex inner and outer geometry. The portion 6 has along its central axis 12 a series of axially spaced apart radial collars 14, at which control geometries in the form of control edges for controlling pressure medium connections of the hydraulic valve, for which the valve plunger 1 is provided, are controllable.

The portion 6 has a substantially cylindrical basic shape, wherein the radial collars 14 represent a maximum outside diameter of the valve plunger 1. Between the radial collars 14, the portion 6 has in each case a radial constriction 16 between two axially spaced apart control edges. The control edges are each underspanned in the region of the constriction 16 by a passageway 18, which approximately has the shape of a hyperbola or ellipse rotated about the central axis 12.

The additively manufactured portion 6 is rotationally symmetrical with respect to the central axis 12 at least as far as its radial collars 14 and radial constrictions are concerned. Furthermore, it is mirror-symmetrical with respect to a midplane 20 which intersects the central radial collar 14 and the normal of which is the central axis 12. The central radial collar 14 has radial mouths 22 of the two passageways 18 on both sides of the plane of symmetry 20. The two radial collars 14 arranged distally starting from the central radial collar 14 correspondingly have the distal radial mouths 24 of the two passageways.

The passageways 18 are delimited towards the central axis 12 by additively manufactured material of the portion 6. This results in the substantially hyperboloidal or ellipsoidal form of the passageway 18, which is formed fluidically without dead spaces.

The additively manufactured portion 6 of the first portion 2 further has in the region of each of the radial collars 14 a hollow space 26 which extends rotationally symmetrically around the central axis. The hollow spaces can each have a discharge cutout (not shown) to the outer circumferential surface of the portion 6, through each of which cutouts non-solidified powder of the additive manufacture can be discharged.

The hollow spaces 26 and the passageways 18 are separated in the radial direction by additively manufactured walls 28 of the portion 6.

Figure 3:
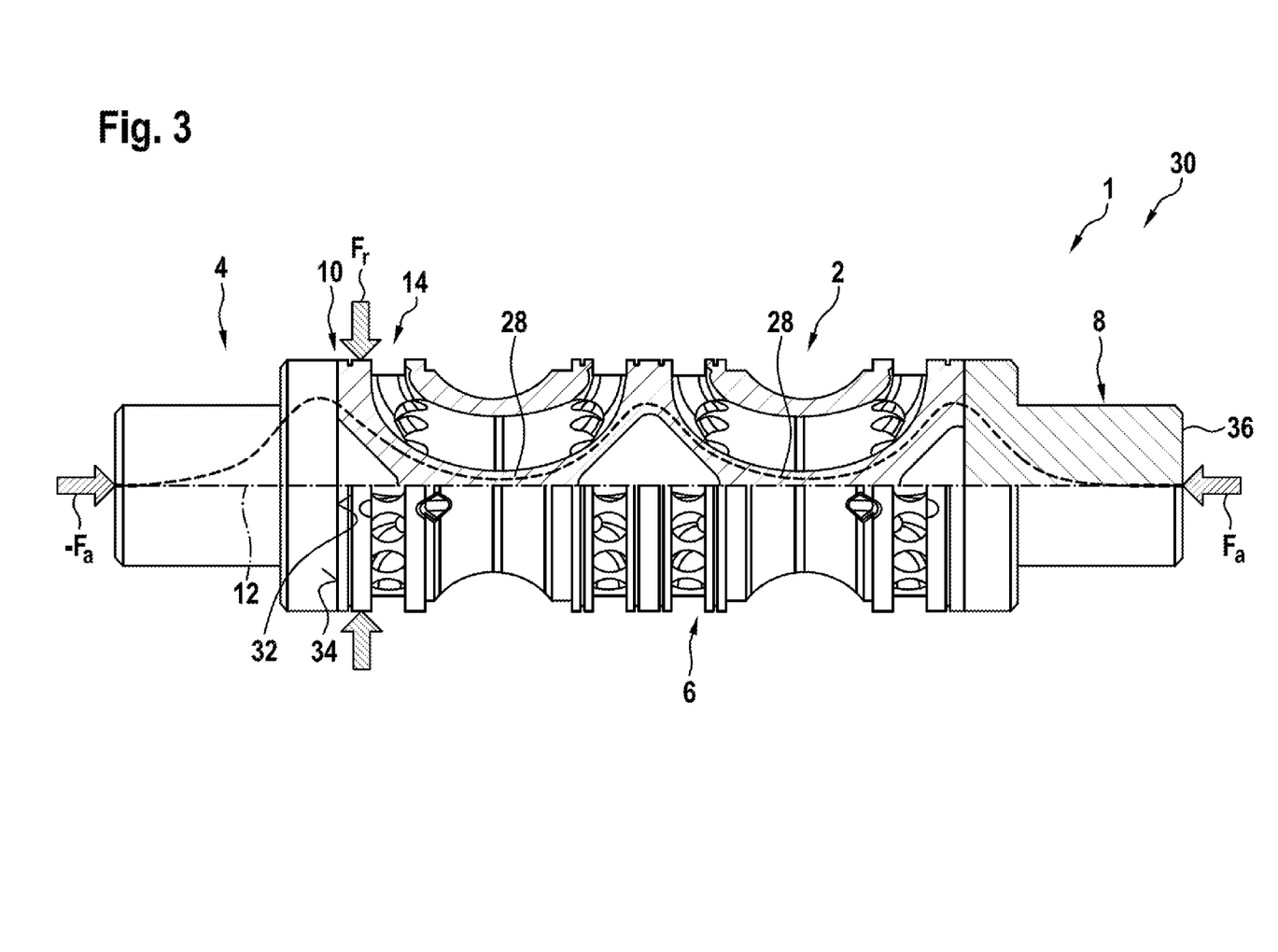
FIG. 3 shows the arrangement according to FIG. 1 with a short clamping portion and a force flow on joining by friction welding.
Figure 4:
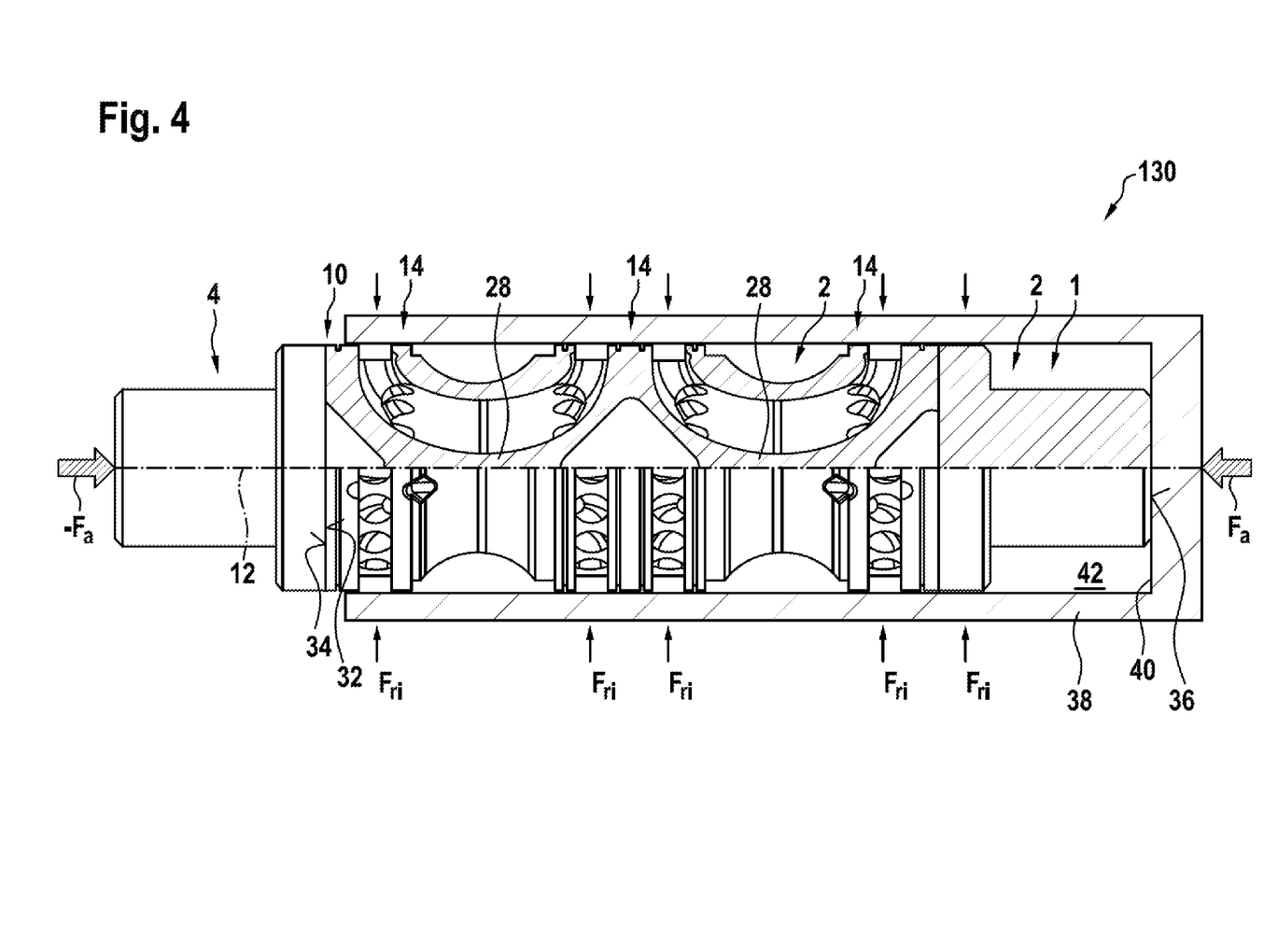
FIG. 4 shows the arrangement according to FIG. 1 with a longer clamping portion and a clamping sleeve.

FIGS. 3 and 4 show two exemplary embodiments of an arrangement 30; 130 with indicated clamping forces $F_a$ (axial force) and $F_r$ (radial force) during an operation of friction welding of the first portion 2 with the second portion 4. The friction-welded joint 10 shown in FIG. 1 is thus produced. The second portion 4 is thereby firmly clamped in a clamping device, not shown, and a friction surface 32 of the second portion 4 is brought into contact with a friction surface 34 of the first portion 2.

At the first portion 2, in particular at the radial collar 14 thereof that is proximal to the second portion 4, a clamping means (not shown) engages a circumferential clamping portion, in particular a circumferential clamping surface, with the radial force $F_r$.

The same or an additional clamping means engages an end clamping portion of the insert 8 of the first portion 2 with the axial force $F_a$.

By means of a drive (not shown), which in the exemplary embodiment is an oscillating drive, the first portion 2 is moved in an oscillating manner about the central axis 12 during joining by friction welding. The frictional force thereby results from the axial clamping force $F_a$. The clamping means of the second portion 4 thereby absorbs the negative, axial clamping force $-F_a$. Accordingly, there is established within the valve plunger 1 so manufactured a force flow from the clamping portion 36, via the walls 28 of the portion 6 of the first portion 2, to the second portion 4, which force flow is shown by a broken line according to FIG. 3. The walls 28 are thereby configured with the wall thickness and shape or topology necessary therefor, so that the portion 6 and thus the valve plunger 1 does not suffer any damage and in particular any deformation during the friction welding.

FIG. 4 shows the same valve plunger 1 as in FIG. 3 and FIG. 1, but in an arrangement 130 that is modified compared to FIG. 3. In a departure, the clamping means for clamping the first portion 2 is here in the form of a slotted clamping sleeve 38. The first portion 2 is inserted into the clamping sleeve until the end clamping portion 36 strikes a sleeve base 40 of the clamping sleeve 38. An interior 42 of the clamping sleeve, which receives the first portion 2 according to FIG. 1, is thereby slightly shorter than the first portion 2. The clamping sleeve 38 is thereby prevented from clamping any portion, even only a short portion, of the second portion 4.

Unlike in the exemplary embodiment according to FIG. 3 of the arrangement 30, the arrangement 130 is now able to distribute the radial clamping force $F_r$ evenly over a plurality, in particular all, of the radial collars 14 of the first portion 2, so that a plurality of radial forces $F_{ri}$ are obtained, which add up to the radial force $F_r$. Consequently, the first portion 2 can be subjected to a radial force $F_r$ with a more even distribution and additionally receives support from radially outwards during the friction welding, so that the axial clamping force $F_a$ can be larger, with an otherwise identical portion 6, or, conversely, with an identical axial clamping force $F_a$, the walls 28 can be made thinner. In this manner, the valve plunger 1 can be made lighter.

FIGS. 2a to 2d show different forms of the friction surface 32 of the second portion 4 before the friction welding. According to FIG. 2a, the friction surface 32 is smooth. Thus, although a second portion 4 that is simpler in terms of device technology is provided for joining, it does not experience self-centering during the oscillating or rotating friction welding.

Figure 2A:
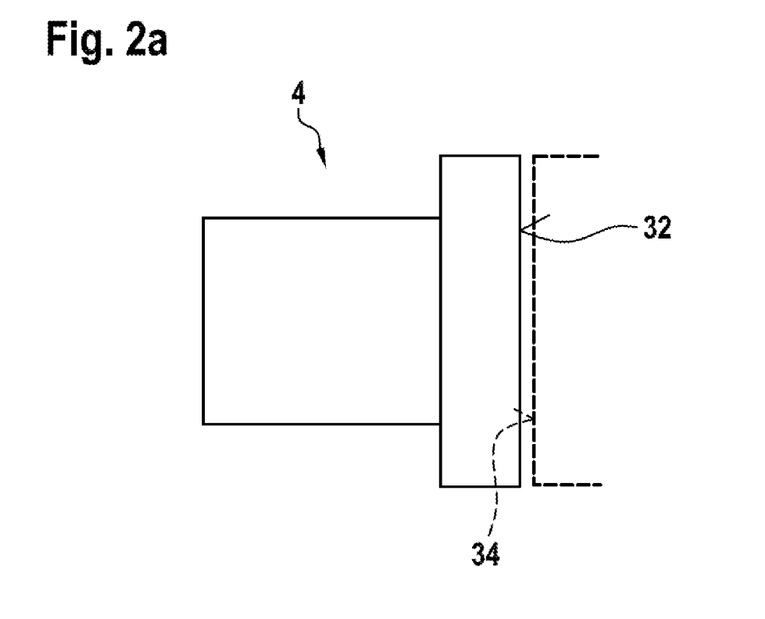
Figure 2B:
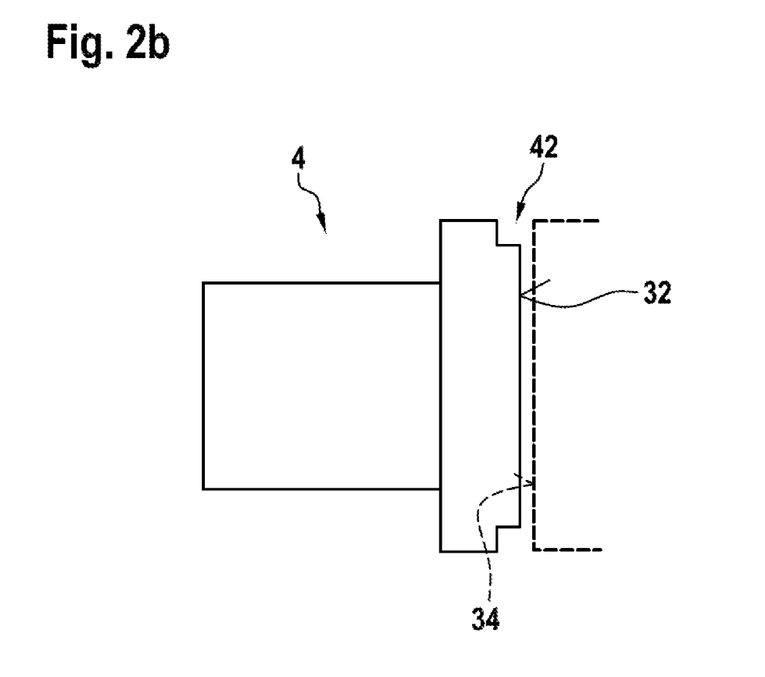

According to FIG. 2b, the friction surface 32 is provided with a groove or partial groove over its entire circumference, so that an upset bead of a melt that forms during the friction welding can be accommodated.

Figure 2C:
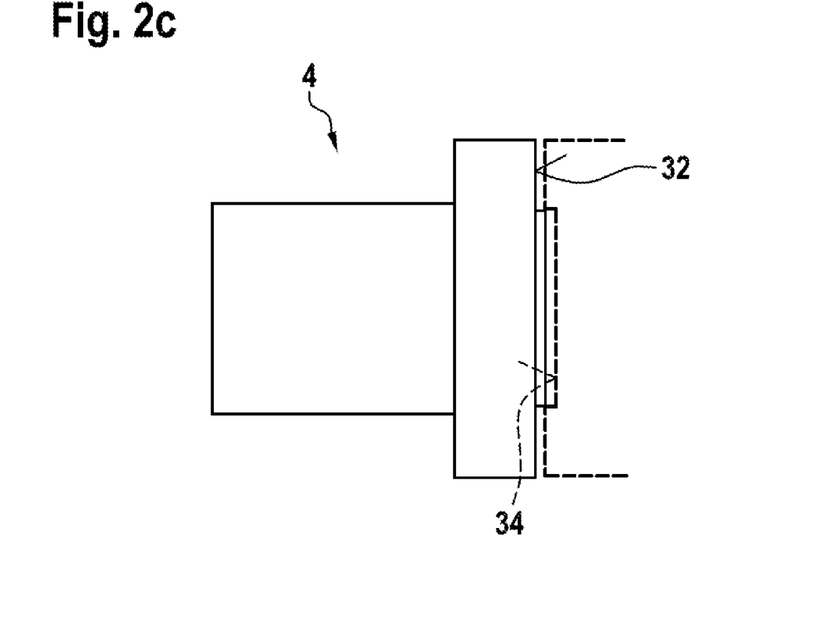

According to FIG. 2c, the friction surface 32 is in the form of a prominently protruding, flat cylinder. If the friction surface 34 of the first portion 2 is in a correspondingly negatively matched form, self-centering can thereby take place during the friction welding, so that the process reliability and simplicity thereof is increased.

Figure 2D:
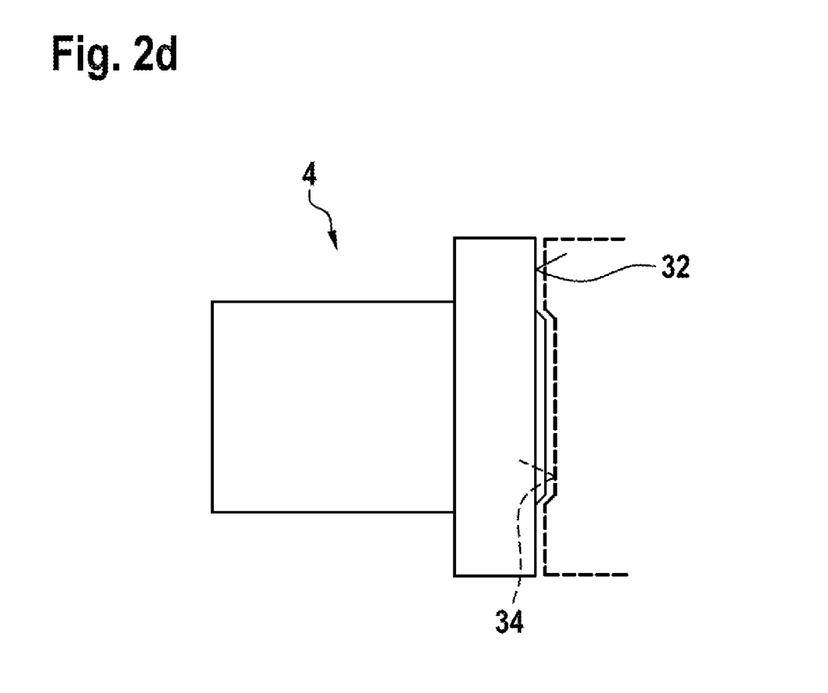

An analogous situation is shown in FIG. 2d, wherein the friction surface 32 is in the form of a truncated cone. Here too, self-centering is made possible with a correspondingly negatively matched friction surface 34 of the first portion 2.

Figure 5A:
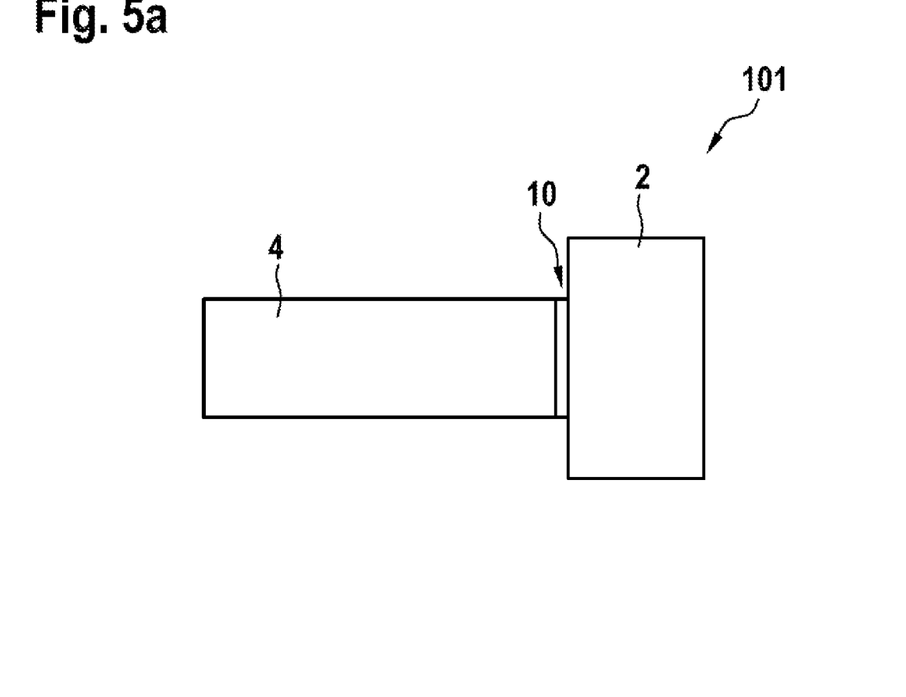
FIGS. 5a-5c show different exemplary embodiments of a component of hydraulics of joined first and second portions.
Figure 5B:
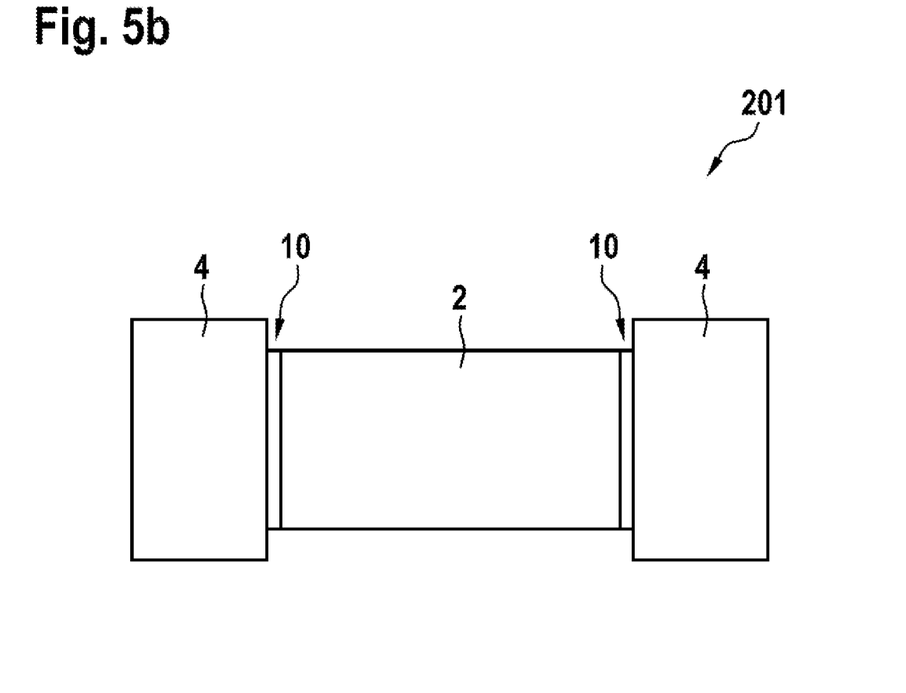
Figure 5C:
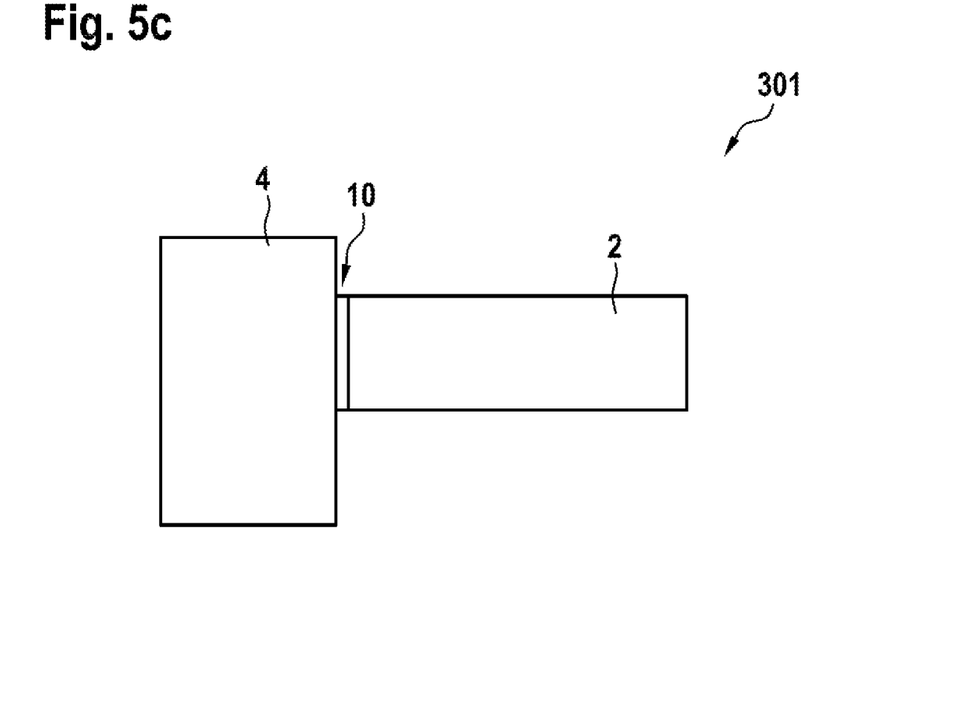

FIGS. 5a to 5c show, schematically, different components of hydraulics 101; 201; 301. According to FIG. 5a, the component 101 is configured with an additively manufactured first portion 2 with in particular high thermal conductivity and a flow-optimized design. The second portion 4 joined thereto is manufactured from an inexpensive material in a conventional manner by turning.

Accordingly, the component 101 represents a focus on the chosen materials of the portions 2, 4, wherein the friction-welded joint 10 increases the degree of freedom of the materials to be chosen compared to conventional welded joints, since it is possible with this joining method to join very different portions of similar materials or different materials.

According to FIG. 5b, a component 201 is shown which has, in the middle, an additively manufactured first portion 2 which has a complex inner and/or outer geometry. Centrally between the friction-welded joints 10, it is joined between two in particular symmetrical second portions 4. These have a comparatively simple geometry and are manufactured conventionally, in particular by turning or milling.

This exemplary embodiment of the component 201 shows that, in addition or alternatively to focusing on the material to be chosen, the friction-welded joint 10 supports the focus on the geometries to be joined.

The component 301 according to FIG. 5c combines by friction welding an additively manufactured first portion 2, wherein the first portion has high electrical conductivity and a heat-dissipating design, with a second portion 4 with poor electrical and thermal conductivity. This can be manufactured either additively or in an alternative way, for example by turning or milling.

The component 301 is thus manufactured with a focus on the function of the individual portions 2, 4.

Joining the additive first portion 2 by friction welding to a second portion manufactured additively or in an alternative way or conventionally opens up hitherto unused technical and economic potentials for components of hydraulics, especially owing to the combinations of function and material that are possible as a result.

Figure 6:
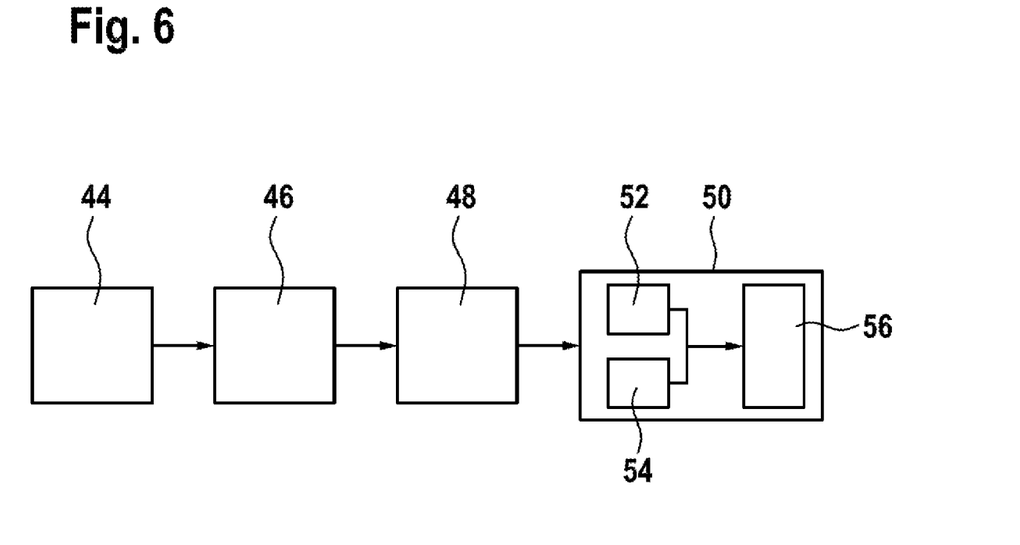
FIG. 6 shows an exemplary embodiment of a method according to the disclosure for manufacturing the component of hydraulics by friction welding.

FIG. 6 shows a method according to the disclosure for joining together a component of hydraulics in the form of a valve plunger, wherein the valve plunger is formed according to the preceding description. First of all, the method comprises a step of "clamping the first portion 2 at its clamping region" (44). Then, or in the reverse order, there is a step of "clamping the second portion 4 (46)". This is followed by a step of "positioning the portions 2, 4 relative to and/or against one another (48)". Finally, there is a step of "joining by a material-bonded connection by means of friction welding (50)". This contains steps of "applying an axial and/or radial clamping force $F_a$ (52)" and "imparting a rotating or oscillating movement to at least one of the portions 2, 4 (54)". Finally, there is a step of "positioning the portions exactly relative to one another under high pressure (56)".

A geometry of the portion manufactured additively at least in part can be symmetrical or unsymmetrical.

A material pairing of the portions can be reproduced by a work sample.

There is disclosed a component of hydraulics via which, on its own or in conjunction with another component of hydraulics, a pressure medium connection or flow can be controlled. In particular, a valve plunger for a hydraulic valve is disclosed. The component is joined together from at least two portions by means of friction welding, wherein at least the portion that has a control geometry is additively manufactured or 3D printed. There is additionally disclosed an arrangement having at least the additively manufactured portion as a semi-finished part for the component, wherein this portion has a clamping portion for absorbing a clamping force necessary for the friction welding. There is additionally disclosed a method for joining together the component from the first portion and at least one further portion by friction welding.

LIST OF REFERENCE NUMERALS

1; 101; 201; 301 Valve plunger
2 First portion
4 Second portion
6 Additively manufactured portion
8 Insert
10 Friction-welded joint
12 Central axis
14 Radial collar
16 Radial constriction
18 Passageway
20 Plane of symmetry
22 Radial mouth
24 Radial mouth
26 Cavity
28 Wall
30; 130 Arrangement
32, 34 Friction surface
36 End clamping portion
38 Clamping sleeve
40 Base
42 Groove, partial groove
44 Clamping the first portion
46 Clamping the second portion
48 Positioning the portions
50 Friction welding
52 Applying a clamping force
54 Oscillating or rotating movement
56 Positioning under pressure
$F_a$, $-F_a$ axial clamping force
$F_r$, $F_{rl}$ radial clamping force

The invention claimed is:

1. A component of hydraulics configured for controlling a pressure medium connection or pressure medium flow, the component comprising:
   a first portion which is additively manufactured at least in part and on which at least one control geometry is formed, the at least one control geometry configured for controlling the pressure medium connection or pressure medium flow; and
   a second portion which is joined to the first portion by friction welding.

2. The component according to claim 1, wherein the component is configured as a housing, a housing portion, or an element configured to be received in the housing and that is movable in the housing.

3. The component according to claim 1, wherein the first portion includes a clamping region configured for attaching a clamping device for the friction welding.

4. The component according to claim 3, wherein the clamping region extends at least in part over an outer circumference and/or axially at an end.

5. The component according to claim 3, wherein the clamping region is divided into circumferentially spaced apart and/or axially spaced apart clamping portions.

6. The component according to claim 3, wherein the clamping region is formed at least in part by an inserted semi-finished part or insert.

7. The component according to claim 1, wherein materials of a first friction-welded region of the first portion and a second friction-welded region of the second portion are the same or are different.

8. The component according to claim 1, wherein the first portion is a hollow body.

9. The component according to claim 1, wherein the first portion is optimized in respect of weight and strength and/or in respect of weight and flow resistance.

10. The component according to claim 1, wherein the component is a valve plunger for a hydraulic valve.

11. The component according to claim 10, wherein the valve plunger is a valve slide and the hydraulic valve is of slide construction.

12. The component according to claim 3, wherein the clamping region is formed on at least one radial collar.

13. An arrangement comprising:
   a loose first portion of a component of hydraulics,
   wherein the loose first portion is configured to be joined by friction welding to a loose second portion to form a component,
   wherein the first portion is at least partially additively manufactured and has at least one control geometry configured for controlling a pressure medium connection or pressure medium flow, and
   wherein the first portion includes a clamping region configured to absorb a clamping force and/or a clamping moment during the joining by friction welding.

14. The arrangement according to claim 13 wherein the second portion is manufactured at least in part additively or in an alternative way.

15. The arrangement according to claim 13 further comprising:
   a clamping device configured to clamp the first portion, wherein an inner lateral surface of the clamping device contacts or is configured to be brought into contact at least in part with the clamping region.

16. The arrangement according to claim 15, wherein the clamping device is a clamping sleeve.

17. The arrangement according to claim 13, wherein the clamping region is divided into clamping portions, which include at least one circumferential clamping portion and/or at least one end clamping portion.

18. The arrangement according to claim 15, wherein:
the clamping region is divided into clamping portions, which include at least one circumferential clamping portion and/or at least one end clamping portion; and
(i) at least one circumferential portion of the inner lateral surface contacts or is configured to be brought into contact with the at least one circumferential clamping portion and/or (ii) at least one end portion of the inner lateral surface contacts or is configured to be brought into contact with the at least one end clamping portion.

19. The arrangement according to claim 13, wherein each of the first portion and second portion includes a friction surface, and the friction surface of at least one of the first and second portions is planar or protrudes axially or is axially depressed.

20. A method for joining a first portion and a second portion of a component of hydraulics to form said component, wherein the first portion is at least partially additively manufactured and includes (i) at least one control geometry configured for controlling a pressure medium connection or pressure medium flow and the (ii) a clamping region configured for attachment of a clamping device, the method comprising:
clamping the first portion at the clamping region;
clamping the second portions;
positioning the first and second portions relative to and/or against one another; and
joining the first portion to the second portion by friction welding to form a material-bonded connection between the first and second portions.

* * * * *